（12） United States Patent
Tsai et al.

(10) Patent No.: US 8,735,842 B2
(45) Date of Patent: May 27, 2014

(54) NON-VISIBLE PARTICLE DETECTION BASED ON SMART PHONE

(75) Inventors: Din Ping Tsai, Taipei (TW); Chih-Chieh Wu, Taipei (TW); Tai-Shan Liao, Taipei (TW); Chi-Hung Huang, Taipei (TW)

(73) Assignee: National Applied Research Laboratories, Taipei (TW)

( * ) Notice: Subject to any disclaimer, the term of this patent is extended or adjusted under 35 U.S.C. 154(b) by 280 days.

(21) Appl. No.: 13/355,525

(22) Filed: Jan. 21, 2012

(65) Prior Publication Data

US 2012/0273688 A1 Nov. 1, 2012

(30) Foreign Application Priority Data

Apr. 29, 2011 (TW) .............................. 100115017 A

(51) Int. Cl.
*G01T 1/20* (2006.01)

(52) U.S. Cl.
USPC ................................ 250/370.11; 250/370.07

(58) Field of Classification Search
USPC ........... 250/361 R, 362, 368, 370.07, 370.09, 250/370.11, 370.14, 371
See application file for complete search history.

(56) References Cited

U.S. PATENT DOCUMENTS

| 2,638,553 A | 5/1953 | Landsverk et al. |
| 4,066,908 A | 1/1978 | Farukhi et al. |
| 7,164,136 B2 | 1/2007 | Aykac et al. |
| 2008/0173820 A1 | 7/2008 | Tseng et al. |

FOREIGN PATENT DOCUMENTS

| JP | 2003-14847 A | 1/2003 |
| TW | 258342 | 9/1995 |
| TW | 300959 | 3/1997 |
| TW | I244556 | 12/2005 |
| TW | I321221 | 3/2010 |

*Primary Examiner* — Mark R Gaworecki
(74) *Attorney, Agent, or Firm* — Cheng-Ju Chiang

(57) ABSTRACT

A non-visible particle detection device includes an optical module capable of converting an ionizing radiation into visible light. The optical module includes has an attachment unit that is configured to removably attach the optical module to the image capturing module of a mobile device. The image capturing module generates a photon digital image based on the photons converted from the ionizing radiation. The mobile device can be implemented with a radiation dose determining module to execute a radiation dose equivalent calculation method. Based on the pixel brightness analysis of the photon digital image, the radiation equivalent dose can be determined. This method sums up the total brightness of all pixels in the images, determines whether the total brightness is smaller than the minimum effective brightness, and determines the radiation equivalent dose when the total brightness is equal to or larger than the minimum effective brightness.

20 Claims, 3 Drawing Sheets

NON-VISIBLE PARTICLE DETECTION BASED ON SMART PHONE

BACKGROUND OF THE INVENTION

1. Field of the Invention

The present invention generally relates to a non-visible particle detection method applied to a mobile device, such as smart phone. Particularly, the present invention relates to applications regarding non-invasion image detection, digital image processing, optical device, and software development for embedded system.

2. Description of the Prior Art

Recently, the tsunami seriously damages Japan's nuclear plant and causes massive radiation leak. The radiation leak includes non-visible particles, such as Alpha ($\alpha$), Beta ($\beta$), Gamma ($\gamma$) particles. Such non-visible photons are invisible and not directly detectable by human senses. If human bodies are exposed to excessive dose of radiation, it will cause damage or lethal effects to individuals. Therefore, in order to detect such non-visible particles, specific instruments that are expensive and have significant volume such as Geiger counters are usually required. Thermo-luminescent dosimeter badges used for monitoring cumulative exposure to ionizing radiation are easy to use, but the badges are worn for a period of time and then must be processed by specific instruments to determine the dose absorbed. That is, such thermo-luminescent dosimeter badges only work for later analysis and cannot provide instant measurements to identify if under a radiation contaminated environment.

In current market, pen type or watch type radiation detectors are available for individuals to determine if under a radiation contaminated environment. However, such pen type or other type portable radiation detectors require batteries to supply power and cannot share the detection result to others through network. Therefore, there is a desire to apply non-visible particle detection method to a mobile device having communication function, such as mobile communication device, so that people can detect non-visible particles and send the detection result to others by the mobile device.

SUMMARY OF THE INVENTION

The present invention provides a non-visible particle detection device utilizing an image capturing module of a mobile device such as smart phone which can obtain a digital photon image from a removable optical module and combining with the concept of image processing to substitute the conventional radiation detector. As such, the optical module together with the image capturing module does not need additional power supply and the original function of the mobile device won't be affected. The image capturing module can obtain the digital photon image at once to overcome the disadvantages of the conventional radiation detector such as expensive, large volume, and high maintenance cost. The non-visible particle detection device of the present invention is easy to use and does not need to change the basic design of the mobile device. For a user, no sophisticated educational training is required to instantly be aware of the radiation equivalent dose and the radiation equivalent dose energy spectrum through the image processing module. The present invention provides a mobile device such as a smart phone to practice the radiation detection device. After the non-visible particle enters the conversion media disposed in an optical chamber, the conversion media converts the non-visible particle into a visible light. Then, the visible light can be captured by the image capturing module of the mobile device and the image capturing module generates a photon digital image based on the visible light, so that a radiation equivalent dose can be determined through a series of processes including imaging process, total brightness determination, average brightness determination, or brightness histogram. The user may utilize the non-visible particle detection device to get the radiation dose of an unknown article or of an ambient environment as soon as possible or to obtain the energy spectrum thereof on the screen of the mobile device without additional power supply or a specific voltage supply device.

The portable radiation dose meter in U.S. Pat. No. 2,638,553 discloses a pen-shaped electrometer device having a coating material such as boron on an ionization chamber, a quartz fiber disposed therein, and an objective lens with a scale disk. When the pen-shaped electrometer device receives a radiation particle such as $\alpha$, $\beta$, or $\gamma$, the radiation particle will hit the boron atom to allow electrons emitted from the boron atom to hit the quartz fiber and cause a displacement. The displacement can be observed by the objective lens to determine the radiation dose. Though the pen-shaped electrometer device does not require any power supply, the quartz fiber of the pen-shaped electrometer device needs a zeroing step every time for using. During the zeroing step, the pen-shaped electrometer device is put in a high voltage charger to let the ionization chamber discharge and let the quartz fiber return back to the zero position, so it is not very convenient. With advances in technology, several inventions are provided by the Institute of Nuclear Energy Research, Taiwan (R.O.C.) such as TW patent NO. 258342 "A handy and highly sensitive Gamma radiation survey apparatus", TW patent NO. I244556 "Simplified design method and device of electronic personal dosimeter", TW patent NO. 300959 "A novel method and device for portable energy spectrum analyzer of ionizing radiations", and TW patent NO. I321221 "Portable radiation detection apparatus and spectrometry analyzing method" that are all portable products but need a battery as power supply wherein a probe head is a photomultiplier tube that needs a high voltage power supply and the circuit arrangement and the instrument assembly are complicated. Though TW patent NO. I244556 utilizes a silicon photodiode, the detection angle of the silicon photodiode is limited and the silicon photodiode needs an external power supply; besides, the catalog of the product of this patent (DOSEPEN-2000) discloses an infrared transmission and needs an exclusive server to demodulate received wireless signal, so it is not a practical device that can report radiation contamination immediately. To overcome disadvantages mentioned above and provide a better dosimeter and a faster notifying function, the present invention provides a non-visible particle detection device utilizing an image capturing module, a GPS telecommunication function. As such, the function of the mobile device is not affected and additional power supply is not necessary. The non-visible particle detection device utilizes a removable optical module attached to the mobile device. The optical module has an optical chamber with conversion media disposed therein to convert the non-visible particle into visible light. After being reflected several times, the visible light emits from a light emitting hole of the optical module and enters the image capturing module of the mobile device to produce a photon digital image. After that, the radiation equivalent dose or the radiation equivalent dose energy spectrum can be obtained based on the photon digital image through imaging processing and processed by a brightness summation unit, a comparing unit, a brightness average unit, a brightness histogram unit, and a radiation determining unit. Information about coordinates, time, the radiation equivalent dose, or the radiation equivalent dose energy spectrum can be shown on the screen of the mobile device, stored in a cloud database, and/or set to others through network, such as a wireless area network.

The user of the mobile device may utilize the present invention, without using additional power supply or changing the basic function of the mobile device, to determine the radiation equivalent dose or radiation equivalent dose energy spectrum of the unknown article and location coordinates for further applications of the mobile device.

DETAILED DESCRIPTION OF THE PREFERRED EMBODIMENT

Figure 1:
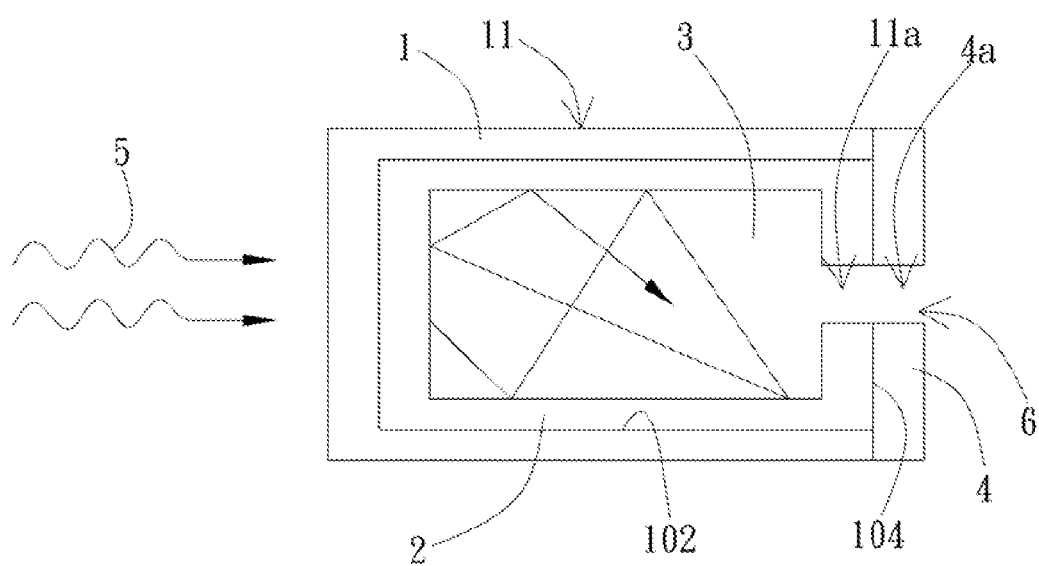
FIG. 1 is cross-sectional view of the optical module of the non-visible particle detection device.

A non-visible particle detection device is embodied as a portable device, wherein an embodiment of the non-visible particle detection device may take a smart phone as a portable device platform and a human-machine interactive interface is provided for the smart phone. The non-visible particle detection device of present invention includes a removable optical module 10 attached to a mobile device 20 (see FIG. 2). One embodiment of the optical module 10 is a housing 11 having a cylindrical optical chamber 1, wherein the housing 11 preferably has a cylindrical shape. A layer of reflective material 2 such as barium sulfate ($BaSO_4$) is coated on the inner wall 102 of the housing 11 in the cylindrical optical chamber 1. Conversion media 3 are disposed in the cylindrical optical chamber 1 of the housing 11, wherein the conversion media 3 includes scintillation crystals, such as Bismuth germinate ($Bi4Ge3O12$) and/or sodium iodide doped with thallium (i.e., NaI(Tl)) crystals, but not limited thereto. Besides, the surface of the scintillation crystal is preferably polished.

An attachment unit 4 is disposed on one end of the housing 11 adjacent to the cylindrical optical chamber 1. That is, the housing 11 has an opening 11a on one end and the cylindrical optical chamber 1 is an open cavity, wherein the attachment unit 4 is disposed on the housing 11 adjacent to the opening 11a. In one embodiment, the attachment unit 4 has a through hole 4a that is aligned with the cylindrical optical chamber 1. In other words, the attachment unit 4 can have a ring shape and is disposed corresponding to the opening 11a of the housing 11 so that the through hole 4a communicates with the cylindrical optical cavity 1. In one embodiment, the attachment unit 4 is preferably made of magnet materials. In other embodiments, the attachment unit 4 can be made of any suitable material incorporated with an attachment part. For example, the attachment unit 4 can be made of non-magnetic material and has a magnetic part or a glue part attached thereto, so that the removable optical module 1 can be attached to the mobile device 20 by means of the attachment part of the attachment unit 4. On one surface 104 of the attachment unit 4 that faces the cylindrical optical chamber 1 and the conversion media 3 is coated with a layer of reflective material, such as barium sulfate. For example, the surface 104 of the attachment unit 4 that is opposite to the attachment part is disposed to face the conversion media 3 and coated with the reflective material to become a reflective surface. As such, the attachment unit 4 and the housing 11 having the cylindrical optical chamber 1 with the conversion media 3 disposed therein and the reflective layer 2 coated thereon together form the optical module 10 having an integrating sphere optical chamber, as shown in FIG. 1.

Figure 2:
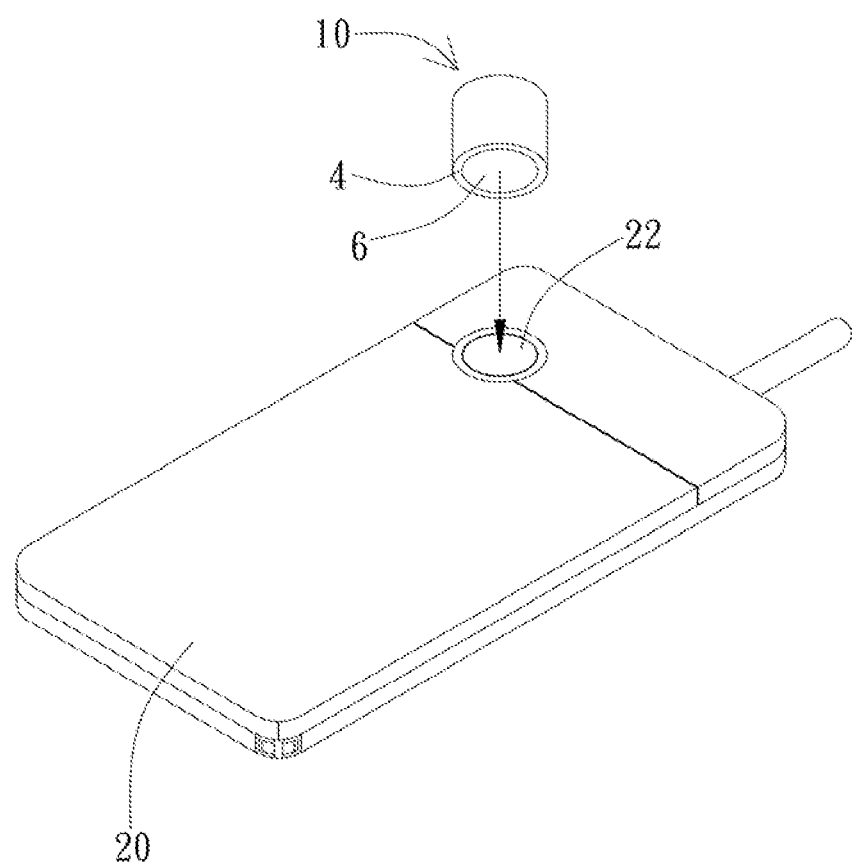
FIG. 2 is a schematic view of the non-visible particle detection device.

When a non-visible particle/photon 5, such as gamma (γ) ray, passes through the housing 11 into the cylindrical optical chamber 1 and into the conversion media 3, the non-visible photon 5 is converted into a visible light, wherein the visible light undergoes a series of reflections and diffuse reflections in the integrating sphere optical chamber of the optical module 10 and emits from a light emitting hole 6 of the optical module 10. As shown in FIG. 1, the light emitting hole 6 can correspond to the through hole 4a of the attachment unit 4. As shown in FIG. 2, by means of the attachment unit 4, the optical module 10 can be easily attached to and detached from the mobile device 20, wherein when the optical module 10 is attached to the mobile device 20, the light emitting hole 6 of the optical module 10 is aligned with an image capturing module 22 of the mobile device 20. For example, the mobile device 20 can be any suitable portable device having an image capturing module such as a camera-embedded smart phone, so that the optical module 10 can be simply disposed and attached onto the mobile device 20 without modifying the exterior design of the mobile device 20 or using additional power supply. When the non-visible particle/photon or ray 5 emits into the cylindrical optical chamber 1 and into the conversion media 3, the conversion media 3 converts the non-visible particle/photon or ray 5 into the visible light. Then, the visible light emits from the light emitting hole 6 of the optical module 10 into the image capturing module 22 of the mobile device 20, so that the image capturing module 22 of the mobile device 20 can obtain a photon digital image.

Figure 3:
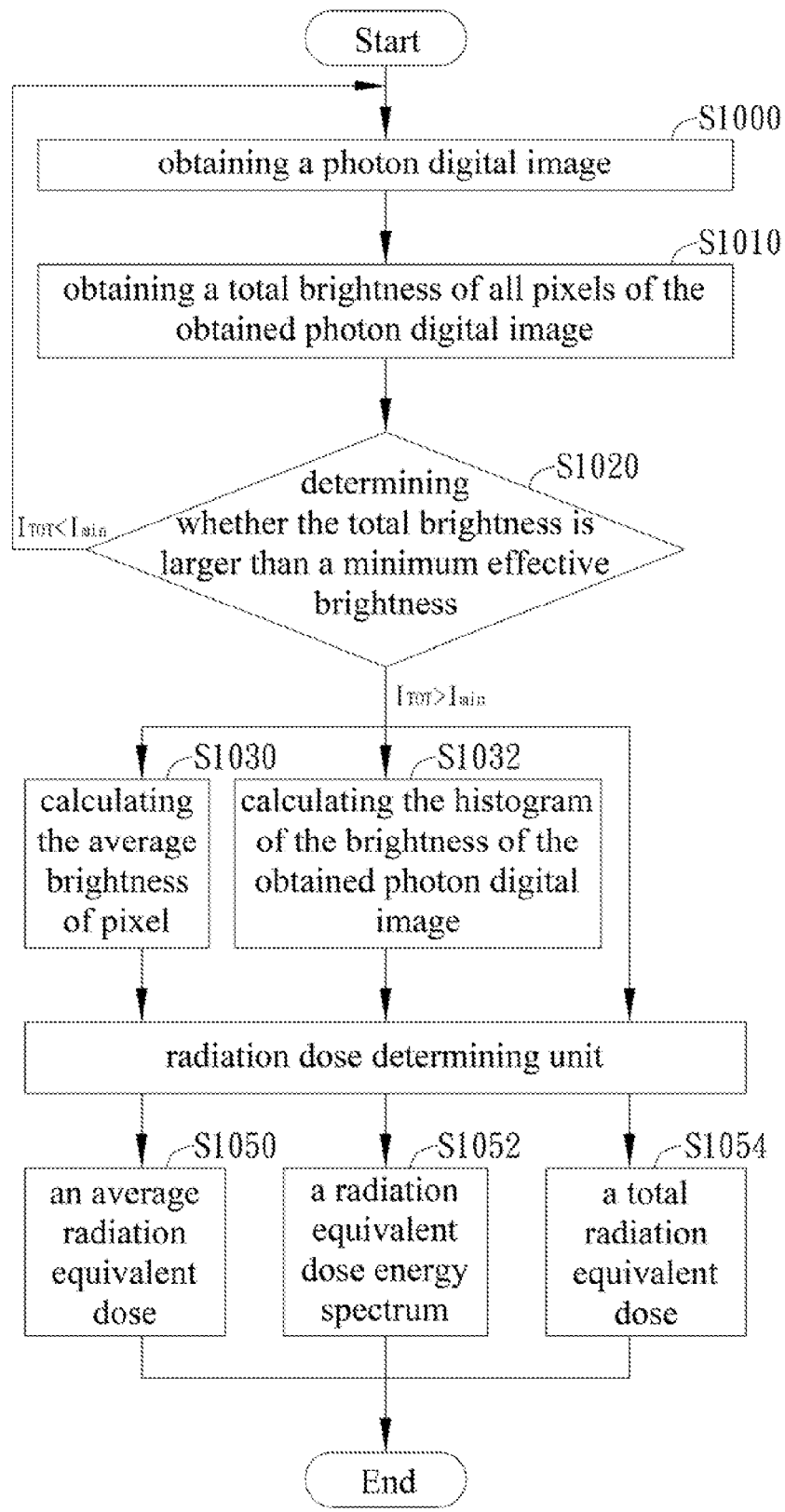
FIG. 3 is a flow chart of the radiation equivalent dose detection method.

As shown in FIG. 3, the non-visible particle detection device will execute a radiation equivalent dose calculation method including the following steps: obtaining a photon digital image (S1000); obtaining a total brightness of all pixels of the obtained photon digital image (S1010); determining whether the total brightness is larger than a minimum effective brightness (S1020); if the total brightness is smaller than the minimum effective brightness, repeating the steps S1000 to S1020 until the total brightness is larger than the minimum effective brightness. For example, the image capturing module 22 obtains the photon digital image based on the photons/visible light converted from the gamma ray and emitted from the light emitting hole 6. The non-visible particle detection device further includes a radiation determining module that determines a radiation equivalent dose of the gamma ray. The radiation determining module includes a brightness summation unit for summing up the brightness of all pixels of the obtained photon digital images to obtain the total brightness and a comparison unit for determining whether the total brightness is equal to or larger than the minimum effective brightness. For example, when a first photon digital image is obtained in S1000, the brightness summation unit determines that the total brightness is the brightness of all pixels of the first photon digital image in S1010. Then, the comparison unit compares the total pixel brightness obtained in S1010 with the minimum effective brightness to determine whether the total brightness is smaller than the minimum effective brightness. If the total brightness is smaller than the minimum effective brightness, the process will go back to the step S1000 to obtain another photon digital image (i.e. a second photon digital image), and the brightness summation unit determines that the total density is the brightness of all pixels of the first photon digital image adding the brightness of all pixels of the second photon digital image. Then, the comparison unit again compares the total pixel brightness with the minimum effective brightness to determine whether the total brightness is smaller than the minimum effective brightness. Such a process is repetitively performed until the total brightness is equal to or larger than the minimum effective brightness. In one embodiment, the brightness summation unit and the comparison unit can be separate units to perform respective functions. However, in other embodiments, the brightness summation unit and the comparison unit can be realized as one summation and comparison unit to perform both the summation and comparison functions.

If the total brightness is equal to or larger than the minimum effective brightness, the method further includes S1030: calculating the average brightness of pixel, or step S1032: calculating the histogram of the brightness of the obtained photon digital image. As shown in FIG. 3, the radiation dose determining module further includes a brightness averaging unit, a brightness histogram unit, and/or a radiation dose determining unit. If the total brightness is equal to or larger than the minimum effective brightness, the comparison unit will transmit a signal to the brightness averaging unit or to the brightness histogram unit that is connected to the radiation dose determining unit, or directly transmits the total brightness to the radiation dose determining unit. After receiving the signal from the comparison unit, the brightness averaging unit divides the total brightness by the number of pixels to obtain the average brightness of pixel. Furthermore, based on the signal from the comparison unit, the brightness histogram unit generates a brightness histogram of the photon digital image. After that, the average brightness, the brightness histogram, and the total brightness are transmitted to the radiation dose determining unit to transform the average brightness, the brightness histogram, and the total brightness into an average radiation equivalent dose (S1050), a radiation equivalent dose energy spectrum (S1052), and a total radiation equivalent dose (S1054).

The non-visible particle detection device performs the radiation equivalent dose calculation method through the radiation determining module including the brightness summation unit, the comparison unit, and at least one of the brightness averaging unit, the brightness histogram unit, and the radiation determining unit to transform the total brightness, the average brightness, or the brightness histogram into the average radiation equivalent dose, the total radiation equivalent dose, or the radiation equivalent dose energy spectrum.

The brightness summation unit of the non-visible particle detection device utilizes a two-dimensional image having the size of M×N, wherein M and N are positive integers. The brightness $I_i$ of any pixel $P_i(x,y)$ of the image in the coordinates (x,y) can be given as:

$$I_i = \text{GrayScale}(P_i(x,y)) \tag{1}$$

wherein the GrayScale (•) is a brightness function of the pixel. The total pixel brightness $I_{TOT}$ can be given as:

$$I_{TOT} = \sum_{i}^{M \times N} I_i. \tag{2}$$

The comparison unit and the brightness summation unit used in the non-visible particle detection device determine the brightness of all pixels and sum up the total brightness ($I_{TOT}$). If the total brightness is smaller than the minimum effective brightness (i.e. $I_{TOT} < I_{min}$ in the step S1020), the method will go back to the step S1000 to obtain another photon digital image and to the step S1010 to sum up the brightness of pixels of all obtained images until the total brightness is equal to or larger than the minimum effective brightness (i.e. $I_{TOT} \geq I_{min}$ in the step S1020).

The brightness averaging unit determines the average brightness of pixel, wherein the average brightness of pixel can be given as:

$$I_{ACG} = I_{TOT}/(M \times N) \tag{3}$$

The brightness histogram unit used in the non-visible particle detection device can generate a histogram based on an one-dimensional function ($m_i$) to calculate the amount of the pixel of each brightness range and can be given as:

$$I_{TOT} = \sum_{i=1}^{k} m_i, \tag{4}$$

wherein k is the number of the brightness ranges; for example, k is between 0 and 255 in a digital image.

The radiation determining unit used in the non-visible particle detection device is corrected by a standard correction source of a specific ionizing radiation and then transforms the brightness into a radiation equivalent dose. The radiation equivalent dose can be given as:

$$E_m = [C_{ed}/(GF \times S_R \times t_c)] \times C \tag{5},$$

wherein $E_m$(unit=Sievert) is a human tissue equivalent dose; $C_{ed}$ is an equivalent dose transformation parameter of the non-visible particle detection device; GF is a geometric factor between the specific radiation source and the non-visible particle detection device (i.e. distance, shielding, or type of the radiation source); $S_R$ (unit=count) is the radiation brightness from a specific radiation source; $t_c$ is a measure time (unit=second or minute); C is the count received from a specific radiation source within $t_c$ (unit=count per second, cps, or count per minute, cpm); $\epsilon_{IR}$ is the brightness-count transformation factor; I is the brightness. It is noted that $C = \epsilon_{IR} \times I$.

The human tissue equivalent dose $E_m$ needs to be corrected by the standard radiation source and an efficiency correction factor $F_{ec}$ to be a modified E (unit=Sievert) that is given as:

$$E = E_m \times F_{ec} \tag{6}.$$

The total radiation equivalent dose $E_{TOT}$ can be given as:

$$E_{TOT} = [C_{ed}/(GF \times S_R \times t_c)] \times (\epsilon_{IR} \times I_{TOT}) \tag{7}.$$

The average radiation equivalent dose $E_{AVG}$ of the non-visible particle detection device can be given as:

$$E_{AVG}[C_{ed}/(GF \times S_R \times t_c)] \times (\Sigma_{IR} \times I_{AVG}) \tag{8}.$$

The radiation equivalent dose energy spectrum $E_{TOT}$ of the non-visible particle detection device can be given as:

$$E_{TOT} = \left[ \frac{C_{ed}}{GF \times S_R \times t_c} \times (\epsilon_{IR} \times I_{TOT}) \right] \sum_{i=1}^{k_i} m_i, \tag{9}$$

wherein $k_e$ is the number of the count ranges and is between 0 and ($255 \times \epsilon_{IR}$) (unit=cps or cpm).

The calculation results of the average radiation equivalent dose, the radiation equivalent dose energy spectrum, or the total radiation equivalent dose mentioned above can be shown on the display screen of the mobile device 20, such as the phone screen, and also can inform the user of such quantitative results of the radiation equivalent dose and the energy spectrum by audio sound. The quantitative results can be stored in a file including coordinates, time, the radiation equivalent dose, or the energy spectrum and shown on the phone screen again for further use. Besides, coordinates, time, the radiation equivalent dose, or the energy spectrum can be further stored in a cloud database. Moreover, as the mobile device has the communication function, the detection results can be transmitted to others through a network directly. For example, the network can be but not limited to a wireless area network, internet, and the like.

It is noted that the radiation determining module can be implemented as software application for executing the radiation equivalent dose calculation method in the mobile device 20, wherein the brightness summation unit, the comparison unit, the brightness averaging unit, the brightness histogram unit, and the radiation determining unit can be embodied as functional blocks of the software application. That is, the non-visible particle detection device can be easily constructed by attaching the optical module 10 to the image capturing module 22 and applying the radiation determining module to the mobile device 20. As such, when the non-visible particle detection function is activated, by simply taking pictures through the image capturing module and running the application for executing the radiation equivalent dose calculation method, the detection result can be instantly obtained, either by text message on the display screen or by the audio sound through the audio module of the mobile device 20. In other embodiments, if the detection result exceeds a safe limit, the user can be warned by audio alarm, warning light, or through vibration of the mobile device 20. More specifically, the mobile device 20 can be provided with two functional keys for activating and deactivating the radiation dose determining module. That is, the mobile device 20 can be provided with two functional keys for starting and ending the application for executing radiation equivalent dose calculation method. When the radiation dose determining module is activated, a series of operation steps of the radiation equivalent dose calculation method as described above are shown on the screen of the mobile device to allow a user to perform and obtain the radiation equivalent dose or the radiation equivalent dose energy spectrum. When the radiation dose determining module is deactivated, the non-visible particle detection device acts as the mobile device. That is, when the application is not executed, the non-visible particle detection device functions just like the regular mobile device.

Moreover, though the optical module 10 of the present invention utilizes a cylindrical optical chamber, the optical module 10 may be a rectangular optical chamber or any shape of optical chamber other than a cylindrical form and such modifications are deemed to be within the scope of the invention. The mobile device 20 may be any kind of mobile devices that can be implemented with the radiation determining module to execute the radiation equivalent dose calculation method of the present invention to serve as the non-visible particle detection device.

In general, the present invention utilizes the optical module 10 and the concept of image processing to combine with the mobile device 20, constructing a portable radiation detection device that can obtain instant detection result just by easy operation. More specifically, a conventional radiation detector is substituted by the optical module 10 and the image capturing module 22 of the mobile device 20 that neither need additional power supply nor affect the original functions of the mobile device 20. The image capturing module 22 can obtain the photon image at once to overcome the disadvantages of the conventional radiation detector such as expensive, large volume, and high maintenance cost. The non-visible particle detection device of the present invention is easy to use and does not need to change the exterior design of the mobile device 20 such a purpose. Through the image processing, the non-visible particle detection device can be operated as an add-on application to the mobile device 20 without any sophisticated educational training to instantly obtain the radiation equivalent dose and the radiation equivalent dose energy spectrum.

Although the preferred embodiments of present invention have been described herein, the above description is merely illustrative. The preferred embodiments disclosed will not limited the scope of the present invention. Further modification of the invention herein disclosed will occur to those skilled in the respective arts and all such modifications are deemed to be within the scope of the invention as defined by the appended claims.

What is claimed is:

1. A non-visible particle detection device, comprising:
a mobile device having an image capturing module;
a removable optical module attached to the mobile device, the optical module converting non-visible particles into photons; and
a radiation dose determining module implemented in the mobile device,
wherein the image capturing module generates a photon digital image from the photons and the radiation dose determining module determines a radiation equivalent dose of the non-visible particles based on the total brightness.

2. The non-visible particle detection device of claim 1, wherein the mobile device is provided with two functional keys for activating and deactivating the radiation dose determining module; when the radiation dose determining module is activated, a series of operation steps of a radiation equivalent dose calculation method are shown on the mobile device to allow a user to perform and obtain the radiation equivalent dose; and when the radiation dose determining module is deactivated, the non-visible particle detection device acts as the mobile device.

3. The non-visible particle detection device of claim 1, wherein the optical module includes a housing having a cylindrical optical chamber with an opening, a reflective layer of barium sulfate coated on the inner wall of the housing in the cylindrical optical chamber, a conversion medium disposed in the cylindrical optical chamber of the housing, and an attachment unit disposed on one end of the housing adjacent to the opening, and wherein the attachment unit attaches the optical module to the mobile device and has a through hole corresponding to the cylindrical optical chamber of the housing.

4. The non-visible particle detection device of claim 3, wherein the conversion medium comprises a surface-polished scintillation crystal of Bismuth germinate ($Bi_4Ge_3O_{12}$) or sodium iodide doped with thallium (NaI (Tl)).

5. The non-visible particle detection device of claim 3, wherein a further reflective layer is coated on the attachment unit and faces the cylindrical optical chamber.

6. The non-visible particle detection device of claim 3, wherein the non-visible particle includes gamma ray, the conversion medium converts the gamma ray passing through the housing into the photons, and the photons exit the housing from a light emitting hole of the optical module into the image capturing module.

7. The non-visible particle detection device of claim 1, wherein the radiation determining module includes a comparison unit for determining whether a total brightness of all pixels of the photon digital images obtained is smaller than a minimum effective brightness, a brightness summation unit for determine the total brightness by summing up the intensities of all pixels of the photon digital images obtained, and a radiation dose determining unit for determining the radiation equivalent dose including a total radiation equivalent dose, an average radiation equivalent dose, and a radiation equivalent dose energy spectrum.

8. The non-visible particle detection device of claim 7, wherein the image capturing module obtains a series of photon digital images until the comparison unit determines that the total brightness of all pixels of the photon digital images is equal to or larger than the minimum effective brightness.

9. The non-visible particle detection device of claim 7, wherein the radiation determining module further includes a brightness averaging unit for obtaining the average brightness and a brightness histogram unit for generating the brightness histogram of the photon digital image.

10. The non-visible particle detection device of claim 9, wherein the radiation determining unit transforms the total brightness, the average brightness of pixel, and the brightness histogram into the total radiation equivalent dose, the average radiation equivalent dose, and the radiation equivalent dose energy spectrum, respectively.

11. The non-visible particle detection device of claim 9, wherein the photon digital image is a two-dimensional image having a size of M×N, wherein M and N are positive integers, the brightness of a pixel in the coordinates (x, y) is given as $I_i = \text{GrayScale}(P_i(x,y))$, wherein GrayScale (•) is a function of brightness, and the total brightness $I_{TOT}$ is given as:

$$I_{TOT} = \sum_{i}^{M \times N} I_i.$$

12. The non-visible particle detection device of claim 11, wherein the average brightness $I_{ACG}$ is given as $I_{ACG} = I_{TOT}/(M \times N)$.

13. The non-visible particle detection device of claim 11, wherein the brightness histogram unit generates the brightness histogram based on an one-dimensional function $(m_i)$ to calculate the amount of the pixel of each brightness range and the brightness histogram is given as:

$$I_{TOT} = \sum_{i=1}^{k} m_i$$

wherein k is the number of the brightness ranges; k is between 0 and 255.

14. The non-visible particle detection device of claim 11, wherein the radiation equivalent dose is given as:

$$E_m = \left[\frac{C_{ed}}{GF \times S_R \times t_c}\right] \times C,$$

wherein $E_m$(unit=Sievert) is a human tissue equivalent dose; $C_{ed}$ is an equivalent dose transformation parameter of the non-visible particle detection device; GF is a geometric factor between the specific radiation source and the non-visible particle detection device; $S_R$(unit=count) is the radiation brightness from a specific radiation source; $t_c$ is a measure time (unit=second or minute); C is the count received from a specific radiation source within $t_c$; $\epsilon_{IR}$ is a brightness-count transformation factor; I is the brightness, wherein the human tissue equivalent dose $E_m$ is corrected by the standard radiation source and an efficiency correction factor $F_{ec}$ to be a modified E (unit=Sievert) that is given as:

$$E = E_m \times F_{ec}.$$

15. The non-visible particle detection device of claim 14, wherein the total radiation equivalent dose $E_{TOT}$ is given as:

$$E_{TOT} = \left[\frac{C_{ed}}{GF \times S_R \times t_c} \times (\epsilon_{IR} \times I_{TOT})\right].$$

16. The non-visible particle detection device of claim 14, wherein the average radiation equivalent dose $E_{AVG}$ is given as:

$$E_{AVG} = \left[\frac{C_{ed}}{GF \times S_R \times t_c} \times (\epsilon_{IR} \times I_{AVG})\right].$$

17. The non-visible particle detection device of claim 14, wherein the radiation equivalent dose energy spectrum $E_{TOT}$ is given as:

$$E_{TOT} = \left[\frac{C_{ed}}{GF \times S_R \times t_c} \times (\epsilon_{IR} \times I_{TOT})\right]\sum_{i=1}^{k_i} m_i.$$

18. A method for determining a radiation equivalent dose of non-visible particles by a mobile device having an image capturing module, comprising:

attaching an optical module to the mobile device, wherein the optical module converts non-visible particles into photons and the photons enter the image capturing module;

obtaining a photon digital image from the photons by the image capturing module;

determining whether a total brightness of all pixels of the photon digital image obtained is smaller than a minimum effective brightness; and if the total brightness is equal to or larger than the minimum effective brightness, determining the radiation equivalent dose of the non-visible particles based on the total brightness.

19. The method of claim 18, wherein if the total brightness is smaller than the minimum effective brightness, repeating the step of obtaining the photon digital image to obtain a plurality of photon digital images and determining the total brightness by summing up the intensities of the photon digital images obtained until the total brightness is equal to or larger than the minimum effective brightness.

20. The method of claim 18, further comprising a step of storing the radiation equivalent dose, a step of informing the user of the radiation equivalent dose by text message or audio sound, or a step of transmitting the radiation equivalent dose to others through a network to a cloud database.

* * * * *